United States Patent [19]

Sullivan et al.

[11] Patent Number: 5,253,834
[45] Date of Patent: Oct. 19, 1993

[54] ALIGNMENT FIXTURE FOR UNOBSTRUCTED PIVOT POINT

[75] Inventors: Edward V. Sullivan, Huntington Station; Benjamin J. Pernick, Forest Hills, both of N.Y.

[73] Assignee: Grumman Aerospace Corporation, Bethpage, N.Y.

[21] Appl. No.: 836,817

[22] Filed: Feb. 19, 1992

[51] Int. Cl.⁵ .............................. F16M 11/12
[52] U.S. Cl. ............................ 248/179; 248/913
[58] Field of Search ............ 248/371, 913, 179, 180, 248/183, 276, 184, 185, 186

[56] References Cited

U.S. PATENT DOCUMENTS

| | | | |
|---|---|---|---|
| 3,331,575 | 7/1967 | Anderson et al. | 248/180 |
| 3,765,631 | 10/1973 | Herbst et al. | 248/183 X |
| 4,426,055 | 1/1984 | Reedy et al. | 248/184 |
| 5,022,619 | 6/1991 | Mamada | 248/913 X |
| 5,040,431 | 8/1991 | Sakino et al. | 248/913 X |

Primary Examiner—David M. Purol
Attorney, Agent, or Firm—Pollock, VandeSande & Priddy

[57] ABSTRACT

A fixture comprising three plates capable of exercising decoupled motion along three angular axes. A first end of a connecting rod is mounted, by way of a spherical bearing in one of the plates, while an opposite end is secured to the peripheral center of a spherical sector platform. The periphery of the platform is supported on bearings mounted to a rotatable gear which imparts yaw motion to the spherical section. Displacement of the connecting rod causes tilting of the spherical section in roll and pitch directions. Three linear and three rotational degrees of freedom are possible for the platform while maintaining a constant pivot point at the center of the sector's radius of curvature, on the system axis. The pivot point lies above the unobstructed mounting surface of this fixture.

6 Claims, 4 Drawing Sheets

ALIGNMENT FIXTURE FOR UNOBSTRUCTED PIVOT POINT

FIELD OF THE INVENTION

The present invention relates to fixtures, and more particularly to a fixture capable of undergoing three axes of rotational motion about a common pivot point fixed in space and three axes of translational motion.

BRIEF DESCRIPTION OF THE PRIOR ART

In order to achieve three rotational degrees of freedom for a fixture, a variety of mounts have been used in the prior art. There are two problems with such mounts. Without a common pivot point for all rotational degrees of freedom, cross-talk or cross-coupling of the motion results. A second problem is the necessity of having structure surrounding and/or above a pivot point about which the mount rotates. Since these types of mounts are often used in connection with optical devices, the obstructing structure often creates blockages of the optical beams and/or interference with the mounted optical device, which diminishes performance of the mounted optical device.

BRIEF DESCRIPTION OF THE PRESENT INVENTION

The present invention is directed to a support structure with a novel angular alignment. The primary objective of this structure is to provide six degrees of freedom including three rotational and three linear degrees of freedom such that a single pivot point for pitch, yaw, and roll motion can be located on the optic axis of an optical system for which the present structure is used. Furthermore, the space surrounding this pivot point is free and clear of parts of the structure itself since the pivot point is located in the free space about *all* structural components. With this capability, any optical component proportionally fitted (to 18 of FIG. 1) and centered with respect to an optical system axis using this alignment device could be rotated without mechanical coupling of rotational motion, so-called cross talk. In addition, the weight of the mounted optical component is predominantly upon the surface on which the component resides instead of on any bracket or frame, as for example on a gimbaled mount.

There are a large variety of uses for such an alignment component. One major use for this device is to align a photographic or similar recording plate that contains a multiple holographic lens (MHL) record. To reconstruct precisely the array of focused beams from an MHL, the plate can be rotated in pitch and yaw, aligned in roll and in the three translational degrees of freedom.

Another important use for this device is to align a crystal polarizer such that it can be correctly oriented with respect to the incident beam to achieve a high polarization extinction ratio.

One further application for this device is to provide a means for cross talk-free angular alignment about a common pivot point as well as translation alignment when used in a servo-controlled system. One specific application would be to align manually or automatically via computer control a matched filter array with an MHL array.

Yet another application is to rotate a mirror or beam splitter about a point on the reflecting surface that is coincident with the common angle pivot point, thereby avoiding unwanted beam displacements and angular shifts due to cross talk effects.

Still another application is to provide for aligning the rotational axis of another mechanically controlled component (such as a scanning mirror or a double Rhomb polarization prism) to that of the system optic axis, with the pivot point or rotation axis of the other component coincident with the system optic axis. One further application is to provide a hologram record alignment means for interferometric systems, such as a system to observe changes in an object's shape using holographic interferometry techniques.

In summary, unique features of this device are as follows:

a. three uncoupled degrees of freedom in rotation;
b. a common device pivot point well above the mounting surface;
c. a pivot point clear of all structural components;
d. no obstructions to the orientation of a mounted optical component;
e. pivot point can be located on the system optic axis;
f. a full 360° yaw rotation capability;
g. a wide range of pitch and roll motions;
h. precision micrometer or equivalent control of angle setting;
i. accommodates a high optic axis high above a reference base;
j. three degrees of freedom in translation;
k. precision micrometer or equivalent control of translation setting.

Although the discussion to this point has been in terms of optical components for utilization with the invention, it should be understood that the present fixture concept has applicability to mounting other devices where three rotational degrees of freedom and three translational degrees of freedom may be achieved without undesirable mechanical coupled motion and/or obstruction.

BRIEF DESCRIPTION OF THE FIGURES

The above-mentioned objects and advantages of the present invention will be more clearly understood when considered in conjunction with the accompanying drawings, in which.

DETAILED DESCRIPTION OF THE INVENTION

Figure 1:
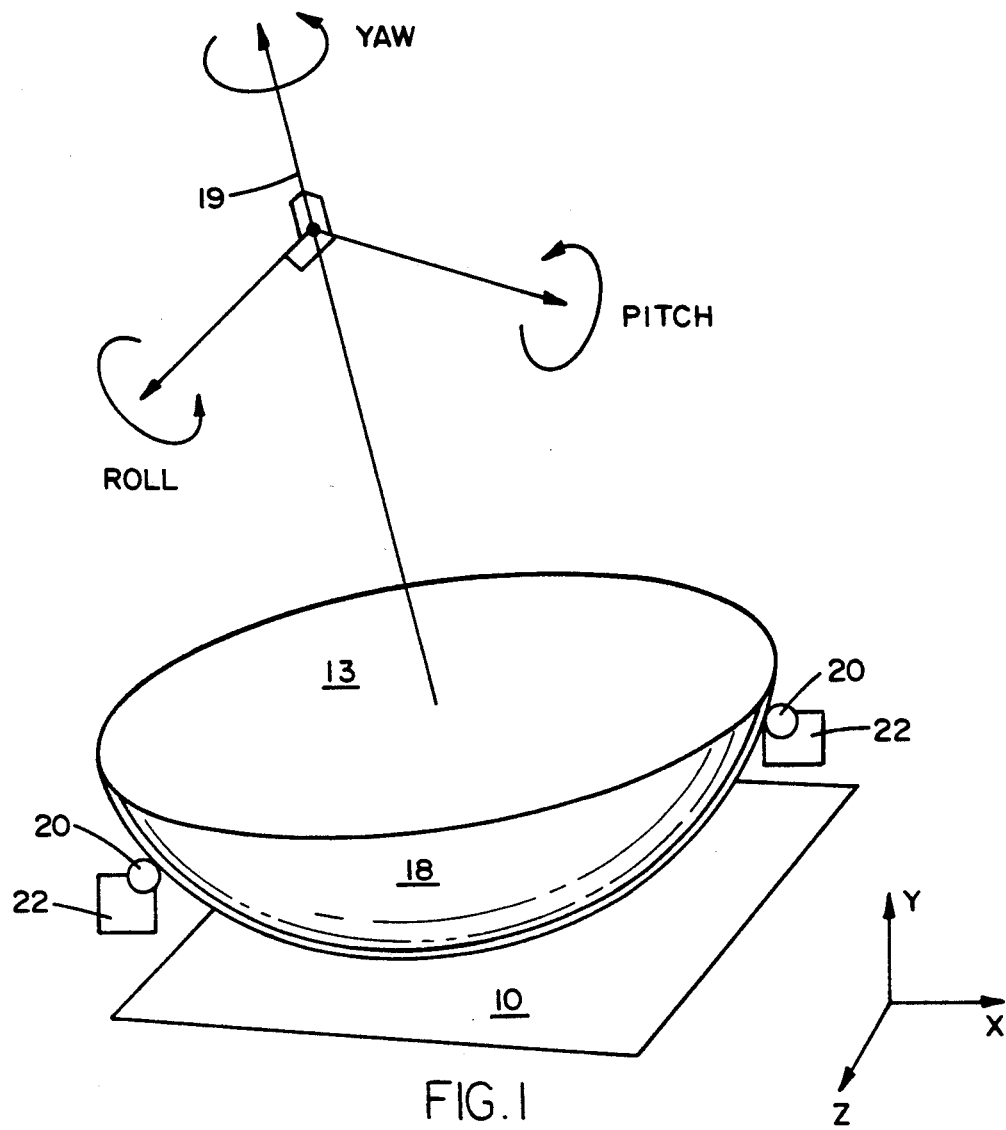
FIG. 1 is a diagrammatic illustration of the present invention.

Referring to the figures, and more particularly FIG. 1 thereof, reference numeral 10 schematically indicates a generalized mounting plate which is capable of undergoing two degrees of linear-to-angular motion when subjected to forces along the indicated x and z axes. A portion of a sphere 18 is supported in a manner to be shown in a later figure, to the generalized mounting plate 10. Relative motion between the plate 10 and the spherical portion 18 is provided. The pivot point 19 is at the center of the spherical section and it is a common pivot point for all three rotations. Note that the pivot point is fixed in space.

The indicated rotations about the pivot point 19 in the figure illustrate the direction in which the spherical section 18 can be rotated to achieve decoupled rotational motion of a component mounted on the top surface 13. A set of three bearings 20 contacts the periphery of the spherical section 18 and serves to restrain the spherical section 18 in such a manner as to retain point 19 as a pivot point fixed in space. The bearings 20 are mounted in bearing blocks 22. Alternate means of support and restraint can be used, such as a single collar, to eliminate the use of items 20 and 22. A collar support will improve the yaw motion control.

Figure 2A:
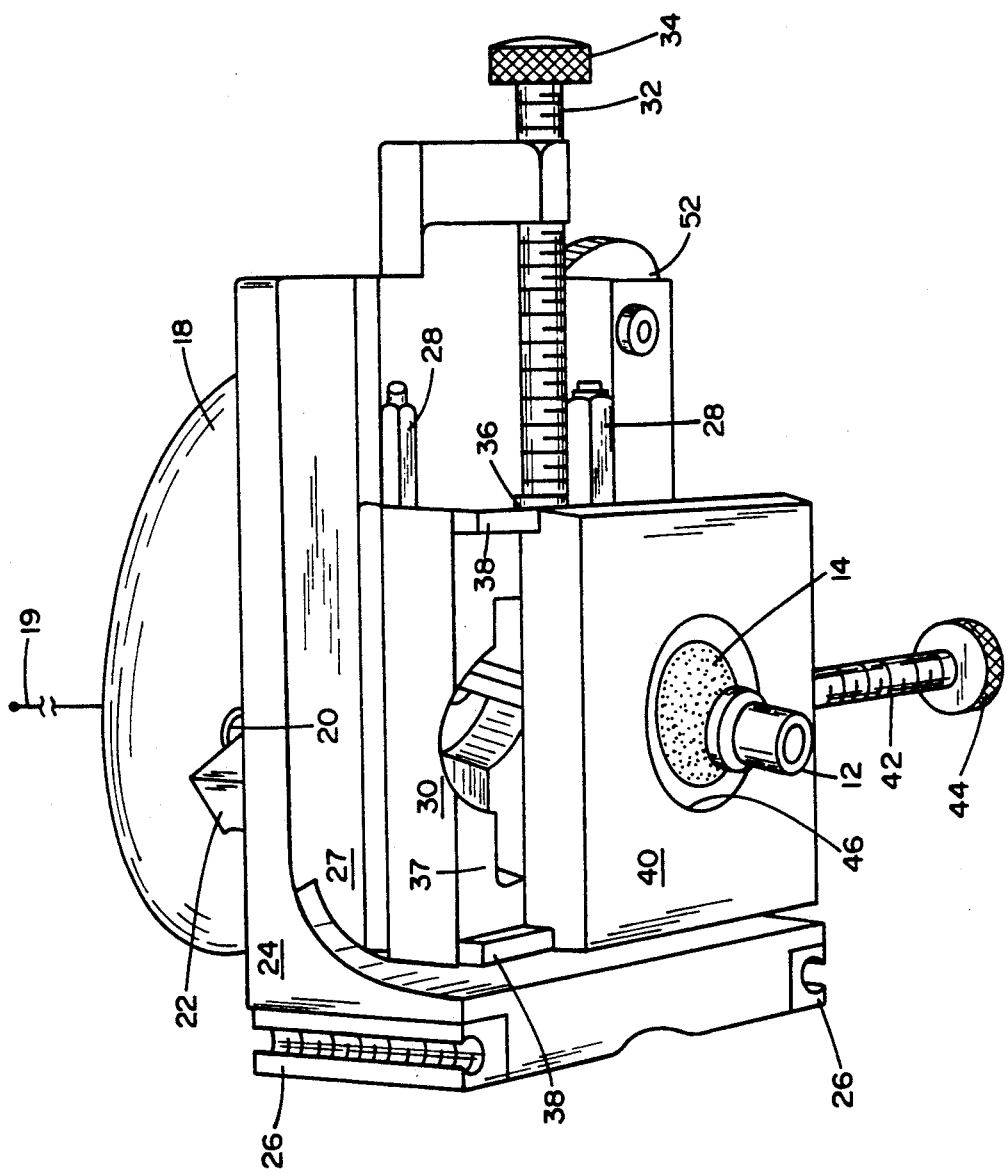
FIG. 2A is a first perspective view of the present invention.
Figure 2B:
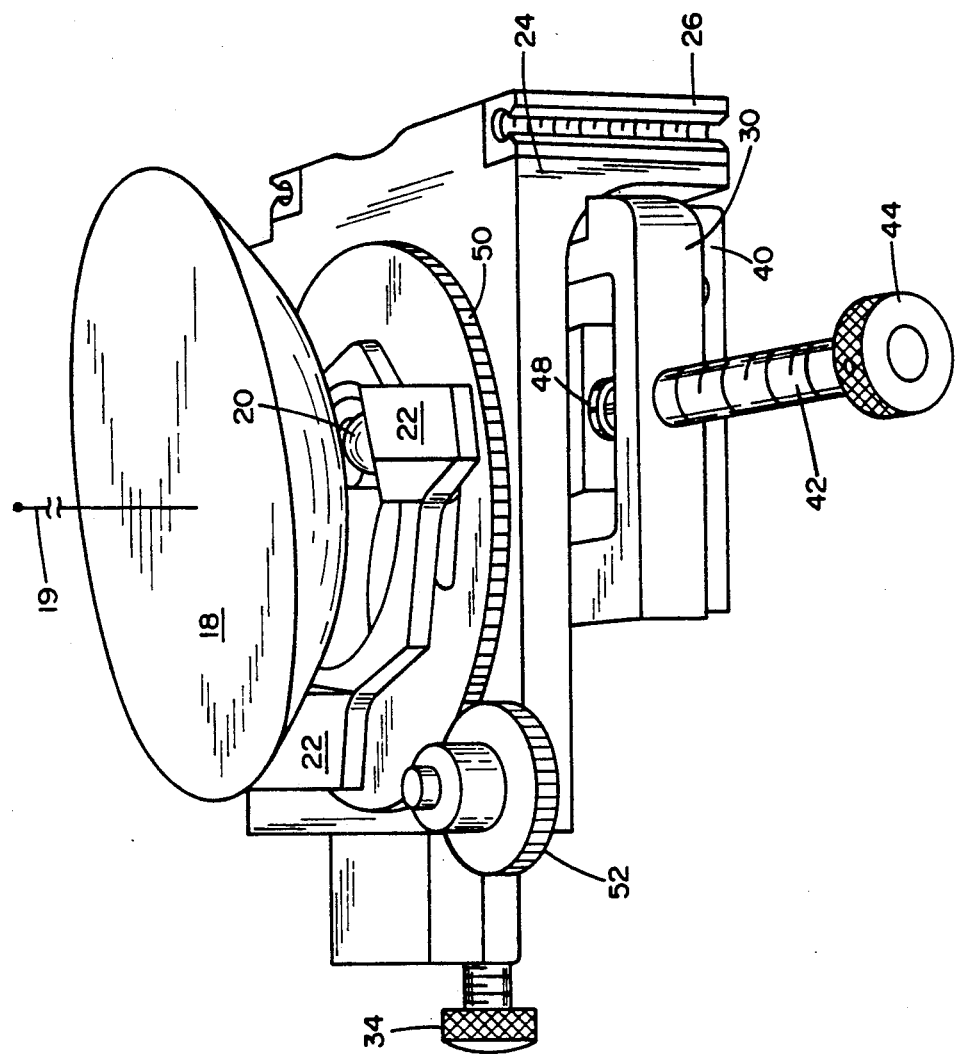
FIG. 2B is a second perspective view of the present invention.

FIGS. 2A and 2B show mechanical implementations for the fixture diagrammatically illustrated in FIG. 1. The figures are isometric drawings showing alternate means. An assembly of individual plates 30 and 40, each of which converts linear-to-angular motion when the spherical bearing 14 is in place.

Figure 3:
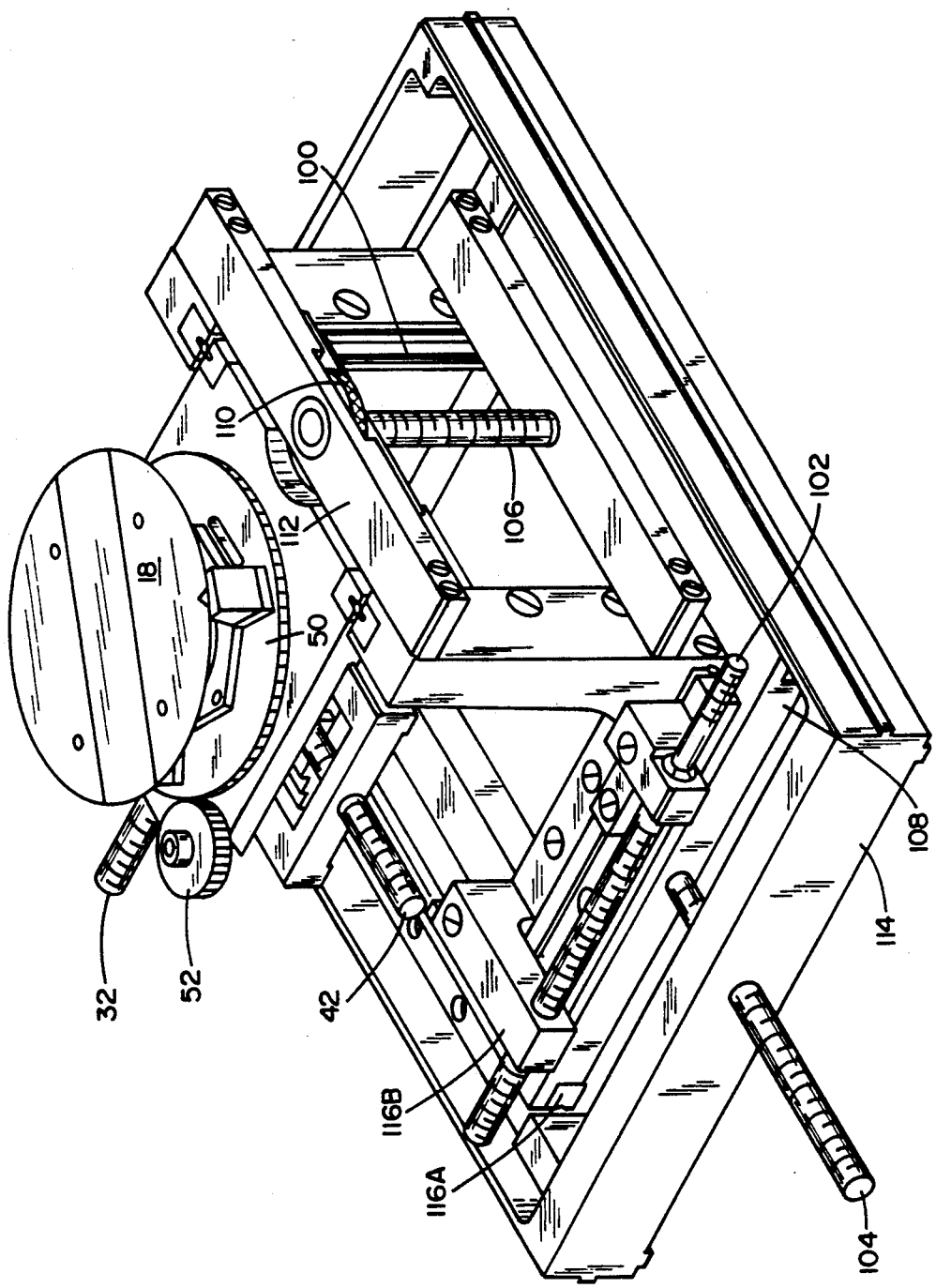
FIG. 3 is a perspective view of a complete invention.

More particularly, L-shaped plate 24 includes oppositely positioned contact members, such as "V-grooved" rails or precision sliding surfaces 26, which are normally positioned in a vertical direction so as to undergo vertical displacement along corresponding rail members (shown in FIG. 3 as 100). An undersurface 27 of the L-shaped plate 24 mounts two parallel rails 28 along which plate 30 slides. A threaded screw 32 having a thumbwheel 34 threadingly engages plate 30 at 36 so as to cause its linear displacement along the rails 28 upon rotation of the threaded screw 32.

The underside 37 of plate 30 mounts two parallel spaced rails 38 upon which the plate 40 may slide. A threaded screw 42 passes through plate 30 and is received within threaded sleeve 48 (shown in FIG. 2B) located in plate 40; and upon turning thumbwheel 44, plate 40 undergoes translational motion orthogonal to that of plates 24 and 30. FIG. 2A also indicates the spherical bearing 14 as being received within retainer ring 46 located in the center of plate 40. Item 50 is a spring-loaded connecting rod which maintains a constant force to item 18 while adjusting screws 32 and 42, convert linear-to-angular motions.

FIG. 2B illustrates the contact between bearings 20 and the periphery of the spherical section 18 In a preferred embodiment of the present invention, there are three such bearings contacting the spherical section; and the bearings are retained within bearing blocks 22. Of course, a support collar may be employed in place of the separately positioned bearings. The bearing blocks 22 are fixed to a large gear wheel 50, which is capable of undergoing 360° of rotation upon turning of mating drive gear 52, which is rotatably mounted to the L-shaped plate 24. As gear wheel 50 is rotated, the spherical section 18 rotates in yaw about the pivot point 19. There is no coupling to the pitch or roll rotational axes.

FIG. 3 is an isometric drawing showing one preferred embodiment of a complete unit. Translation in the x-direction is accomplished with the threaded rod 102, in the z-direction with a threaded rod 104, and in the vertical y-direction with a threaded rod 106. Threaded rod 104 is attached to the fixture mounting plate 108. It is positively locked to the mounting plate 108 by opposing bearings contained within plate 108. Threaded rod 106 is connected to a thumb wheel 110 and causes plate 112 to move in a positive or negative vertical direction. Base plate 114 provides z-axis movement for the mating pair of rails 116A and 116B. The bottom face of base plate 114 is supported by the top surface of the optical system.

Figure 4:
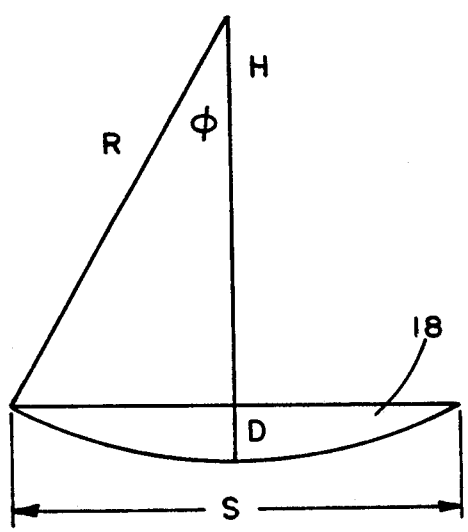
FIG. 4 is an illustration used in an analysis.

FIG. 4 shows some of the parameters that are important in the design of this device. In particular, the figure illustrates the spherical section 18, a maximum rotational displacement angle $\phi$, (either pitch or roll), the radius of curvature of the spherical segment R, the height H above the mounting surface to the pivot point 19 and the width of the mounting surface S.

From the figure one has $$H + D = R \tag{1}$$

$$\cos \phi = H/R \tag{2}$$

$$\sin \phi = (S/2)/R \tag{3}$$

Choose R and $\phi$ as independent variables. Then one finds $$D = R(1 - \cos\phi) \tag{4}$$

$$H = R \cos \phi \tag{5}$$

$$S = 2R \sin \phi. \tag{6}$$

For example, let $\phi = 45°$ and R = 4.0 inches. Then
H = 2.83 inches
D = 1.17 inches
S = 5.66 inches.

According to the preceding description, the present invention offers a fixture or platform capable of exercising three translational degrees of decoupled motion and three rotational degrees of decoupled motion in roll, pitch, and yaw.

It should be understood that the invention is not limited to the exact details of construction shown and described herein for obvious modifications will occur to persons skilled in the art.

We claim:

1. A fixture having a platform movable with six degrees of freedom comprising:

mounting means for selectively undergoing translational displacement in three orthogonal directions;

connecting rod at the bottom end of a spherical bearing located in the mounting means, a top end of the connecting rod being pivotally connected to the peripheral center of a spherical sector platform, movement of the connecting rod causing the platform to undergo rotation in roll and pitch;

bearing means contacting the platform periphery for maintaining the sector's center of curvature at a fixed point in space thereby serving as a pivot point of the platform; and means for rotationally mounting the bearing means for allowing the platform to undergo yaw while maintaining a constant center of curvature;

whereby the space outwardly of the platform is free of structure.

2. The fixture set forth in claim 1 together with threaded means for individually adjusting the mounting means in each of the three orthogonal directions.

3. The fixture set forth in claim 1 wherein the means for mounting the bearing means in contact with the sector periphery includes a gear having an axis coincident with the platform's center of curvature.

4. A fixture executing three degrees of freedom of motion comprising:

a base plate movable in a first linear direction;

a second plate slidably mounted on the base plate for decoupled motion with the base plate in the first linear direction as well as in a second linear direction orthogonal to the first linear direction;

a third plate slidably mounted to the second plate for allowing translation of the third plate in the second as well as a third linear direction orthogonal to the first and second directions;

a rotatable spherical sector platform mounted to the third plate and movable in all three orthogonal directions, in decoupled motion with the base, second and third plates;

bearing means contacting the periphery of the platform for allowing roll, pitch, and yaw rotation of the platform while maintaining a constant center of curvature;

a connecting rod connected at a first end thereof to a spherical bearing in the base plate, and at an opposite end thereof to the peripheral center of the platform, movement of the rod causing roll and pitch rotation of the sector; and gear means rotationally connected to the third plate and mounting the bearing means thereon for causing decoupled rotation of the platform in the yaw direction.

5. The fixture set forth in claim 4 together with individual threaded means for displacing each plate in a respective linear direction.

6. The fixture set forth in claim 4 wherein the gear means has a central axis coincident with the platform center of curvature.

* * * * *